US007746827B2

(12) United States Patent
Xue et al.

(10) Patent No.: US 7,746,827 B2
(45) Date of Patent: Jun. 29, 2010

(54) METHODS AND ARRANGEMENTS FOR SELECTION OF A WIRELESS TRANSMISSION METHOD BASED UPON SIGNAL TO NOISE RATIOS

(75) Inventors: Feng Xue, Santa Clara, CA (US); Jun Shi, San Jose, CA (US); Sumeet Sandhu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 573 days.

(21) Appl. No.: 11/731,528

(22) Filed: Mar. 30, 2007

(65) Prior Publication Data

US 2008/0239977 A1    Oct. 2, 2008

(51) Int. Cl.
    *H04W 4/00* (2009.01)
(52) U.S. Cl. ........................................ 370/332; 370/252
(58) Field of Classification Search ................. 370/252, 370/253, 310, 319, 320, 321, 322, 329, 332, 370/335, 337, 342, 343, 347, 348, 441, 442
    See application file for complete search history.

(56) References Cited

U.S. PATENT DOCUMENTS

| 7,558,255 | B2* | 7/2009 | Vasudevan | .................. 370/355 |
| 2004/0141481 | A1* | 7/2004 | Lee et al. | ..................... 370/335 |
| 2005/0208965 | A1* | 9/2005 | Nakajima | ................. 455/552.1 |
| 2006/0013181 | A1* | 1/2006 | Stolpman et al. | ............. 370/342 |
| 2006/0105761 | A1* | 5/2006 | Walton et al. | ................ 455/423 |
| 2007/0093262 | A1* | 4/2007 | Li et al. | .................... 455/552.1 |
| 2007/0178935 | A1* | 8/2007 | Shim et al. | ................ 455/552.1 |
| 2008/0031369 | A1* | 2/2008 | Li et al. | ........................ 375/260 |

* cited by examiner

*Primary Examiner*—Ricky Ngo
*Assistant Examiner*—Wei-Po Kao
(74) *Attorney, Agent, or Firm*—Schubert Osterrieder & Nickelson PLLC; Neil Cohen

(57) ABSTRACT

Methods and arrangements for wireless communications are contemplated. Embodiments include transformations, code, state machines or other logic to determine the signal to noise ratios (SNRs) of multiple stations associated with an access point in a wireless network. The embodiments may also include selecting whether one of the stations communicates with the access point by an orthogonal frequency division multiplexing (OFDM) transmission method or a multiple-access joint coding/decoding transmission method, the selecting based upon the SNRs and communicating the selected transmission method to the station of the multiple stations. Some embodiments may include determining an SNR threshold level, selecting the MAC transmission method if the SNR of at least one of the multiple stations is below the SNR threshold level, and selecting the OFDM transmission method if the SNRs of all of the multiple stations are above the SNR threshold level. Other embodiments are described and claimed.

18 Claims, 4 Drawing Sheets

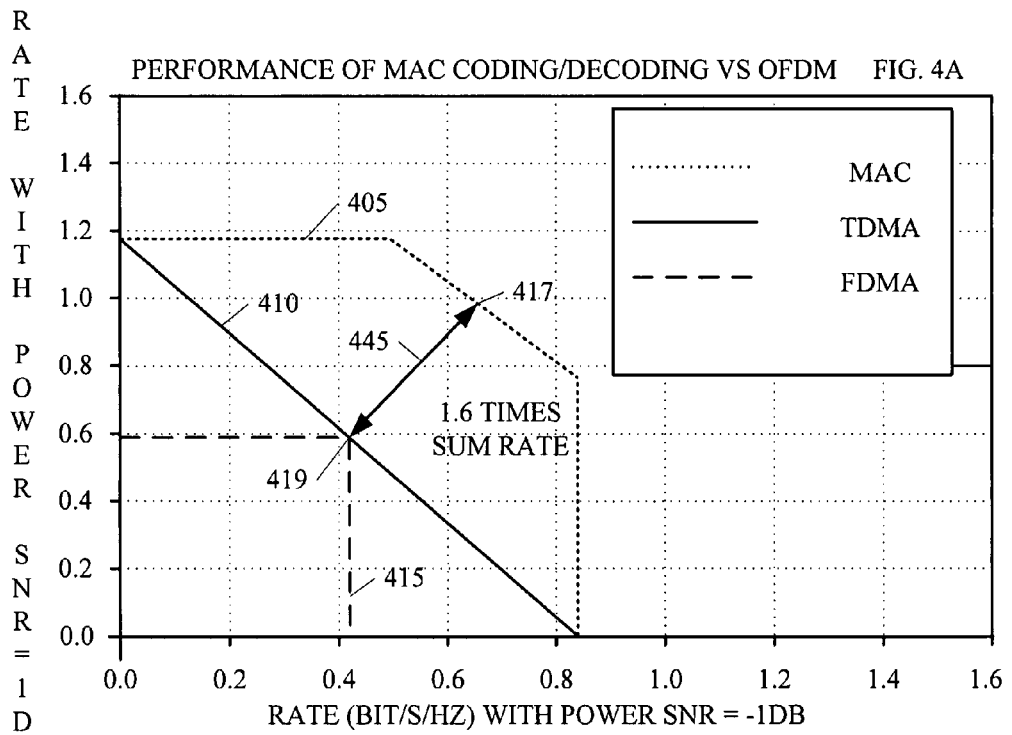
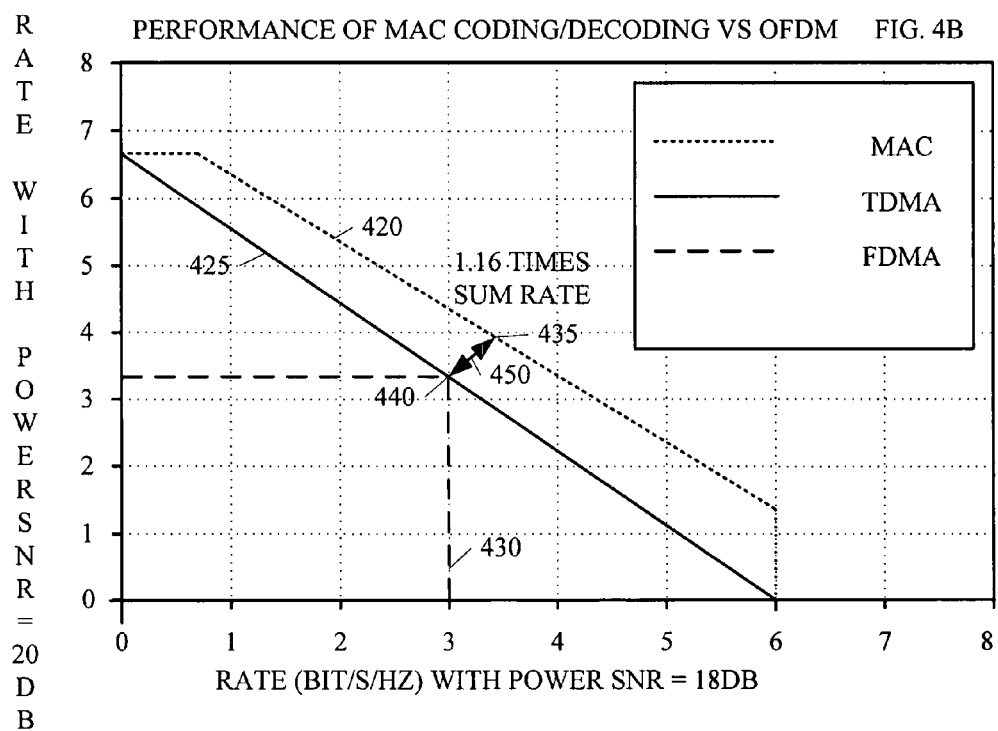

METHODS AND ARRANGEMENTS FOR SELECTION OF A WIRELESS TRANSMISSION METHOD BASED UPON SIGNAL TO NOISE RATIOS

FIELD

The present invention is in the field of the field of wireless communications. More particularly, embodiments are in the field of signal level-based multiple-access wireless communications architectures.

BRIEF DESCRIPTION OF THE DRAWINGS

Aspects of the invention will become apparent upon reading the following detailed description and upon reference to the accompanying drawings in which like references may indicate similar elements:

FIG. 4A is an exemplary graph comparing total throughput by a multiple access with joint coding/decoding (MAC) transmission method to total throughput by an orthogonal frequency division multiplexing (OFDM) transmission method for two wireless devices with low SNRs; and FIG. 4B is an exemplary graph comparing total throughput by a MAC transmission method to total throughput by an OFDM transmission method for two wireless devices with high SNRs.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Generally speaking, methods and arrangements for wireless communications are contemplated. Embodiments include transformations, code, state machines or other logic to determine the signal to noise ratios (SNRs) of multiple stations associated with an access point in a wireless network. The embodiments may also include selecting between an orthogonal frequency division multiplexing (OFDM) transmission method and a multiple-access joint coding/decoding (MAC) transmission method for communications between one of the stations and the access point, the selecting based upon the SNRs. The embodiments may also include communicating the selected transmission method to the station. Some embodiments may include determining an SNR threshold level, selecting the MAC transmission method if the SNR of at least one of the multiple stations is below the SNR threshold level, and selecting the OFDM transmission method if the SNRs of all of the multiple stations are above the SNR threshold level. While specific embodiments will be described below with reference to particular circuit or logic configurations, those of skill in the art will realize that embodiments of the present invention may advantageously be implemented with other substantially equivalent configurations.

Figure 1:
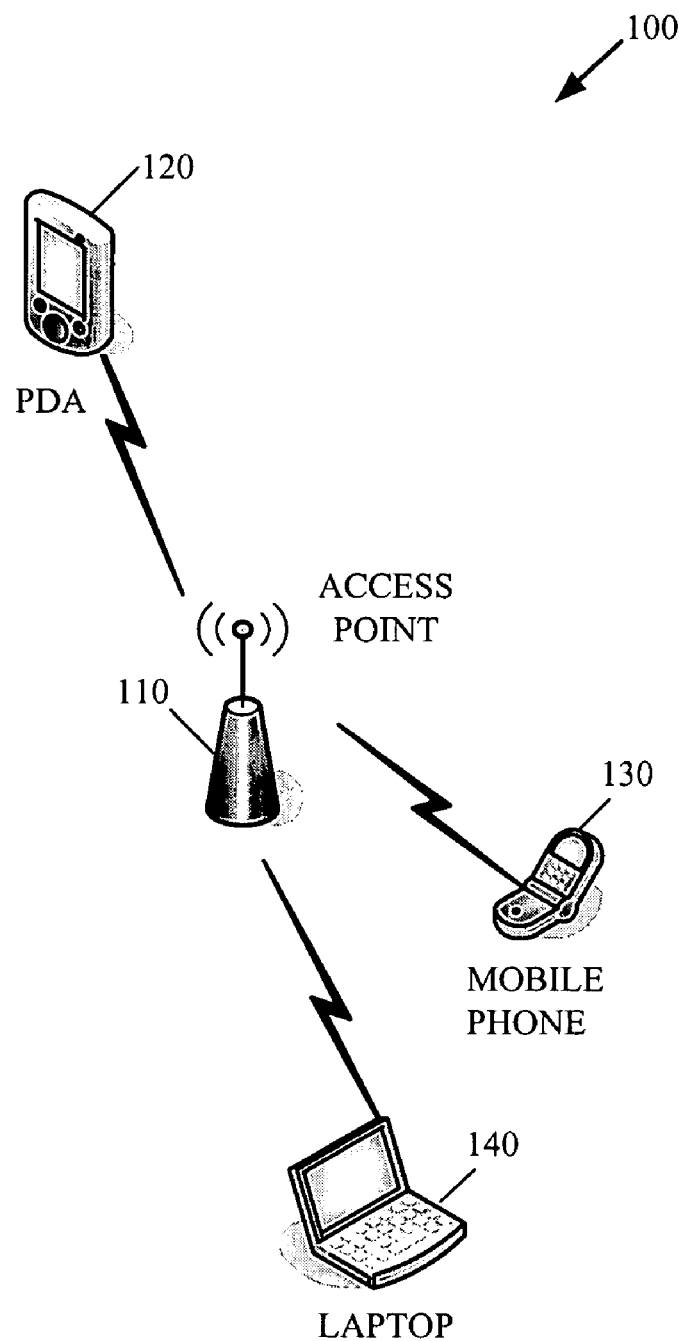
FIG. 1 is a diagram of an embodiment of a wireless network.

FIG. 1 is a diagram of an embodiment of a wireless network 100. The devices comprising a wireless network transmit and receive by means of radio frequencies (RF). An RF transmitter may impress digital data onto an RF frequency for transmission of the data by electromagnetic radiation. The RF transmitter may, for instance, modulate a carrier wave. An RF receiver may receive electromagnetic energy at an RF frequency and extract the digital data. The RF receiver may, for example, demodulate the received radio waves.

The wireless network 100 includes access point 110 and wireless devices or stations PDA 120, mobile phone 130, and laptop 140. Access point 110 may communicate with each of the wireless devices 120, 130, and 140 and may relay messages from one of wireless devices 120, 130, 140 to another. The access point 110 may thus act as an intermediate point in the wireless network. In some embodiments, access point 110 may comprise an access point for a wireless local area network (WLAN), operating according to the standards of IEEE 802.11.

The wireless devices of FIG. 1 may communicate by a variety of transmission methods. In orthogonal frequency division multiplexing (OFDM), the available frequency spectrum of the channel is subdivided into a large number of sub channels representing portions of the available frequency bandwidth. An information signal to be transmitted, such as a bit stream, is divided into portions, and the portions are sent simultaneously over the various sub channels. A receiver receives the signals, separates them by frequency, deciphers the signals for each frequency, and combines them again to produce the transmitted information. The subbands are selected so as not to interfere with each other.

OFDM may be combined with access by multiple transmitters to the available frequency spectrum. In time-sharing OFDM (TDMA), access is divided by time. Each transmitter may transmit over the entire frequency spectrum for portions of the entire time. The allotment may be in equal shares, or some stations, such as some of the wireless devices of FIG. 1, may receive a greater allotment of time because of the nature of their communications. For example, quality of service considerations may provide a time priority to stations transmitting voice messages. In still other allotments, the time may be divided by quality of reception. Stations with weaker signals may be allotted more time to allow slower, more accurate transmission to overcome the poor reception.

In frequency-sharing OFDM (FDMA), access is divided up by frequency. Several transmitters, such as the wireless devices of FIG. 1, may transmit simultaneously, each over its separate assigned portions or sub channels of the available frequencies. For example, if there are four stations and 1024 subchannels, each station may be allotted 256 consecutive subchannels for communications. In some embodiments, TDMA may be combined with FDMA. Different sets of transmitters may transmit simultaneously over different sub channels of the available frequencies. For example, if eight stations are connected to an access point, half may be allowed to transmit at some intervals and the other half at the other. During an interval, the four stations transmitting may each be allowed ¼ of the available channels.

OFDM may provide for effective transmission in conditions of good reception. OFDM may enable transmission with relatively low power and relatively simple coding methods. In poor channel conditions, however, OFDM may not work as well as other transmission methods. FCC regulations may impose more severe power restrictions on OFDM transmission methods than other transmission methods. The regulations impose limits on the maximum power and field strength of non-broadcast wireless transmitters, such as the wireless devices of FIG. 1 and other wireless devices connected by wireless networks. See 47 CFR Ch 1, part 15, and 47CFR §§15.347, 15.349, and 15.351. Under the regulations, wireless devices which share bandwidth under OFDM are treated as a single device. The FCC regulations restrict the total maximum power of the wireless devices to the amount allowed a single device. In contrast, in other transmission methods, the power available to a device is not reduced because of the power used by another.

Another transmission method, multiple access with joint coding and decoding (MAC), may provide better reception in poor signal quality conditions. In this transmission method, multiple transmitters, such as the wireless devices of FIG. 1, may operate simultaneously, each using the full range of available frequency spectrum, and each transmitting with full allotment of power permitted to a single wireless device under FCC regulations. The information to be transmitted is coded on transmission, and decoded upon reception.

In one general type of coding, transmissions are limited to a set of permissible words of fixed length from an input alphabet. In the case of digital data, the input alphabet is composed of bits, or 0's and 1's, and the permissible words are binary words. The bits in a message may be converted to permissible words and transmitted. For example, if there are 8 permissible words, then each three-bit segment of information may be translated into one of the permissible words. If the receiver, such as a wireless device of FIG. 1, receives a word that is outside the permissible set, it may attempt to calculate the permissible word that was most likely transmitted given the word that was received. With the proper selection of permissible words, this general type of coding may provide good error correction. A receiver may often correctly distinguish one code word from another even in the presence of substantial noise and multipath interference. Thus, coding may reduce the effect of interference from the simultaneous transmissions allowed by a multiple access transmission method.

One form of this coding, Complementary Code Keying (CCK), consists of a set of 64 8-bit code words. It has been adopted by the 802.11b protocol. Another form of this coding is a low-density parity-check (LDPC) code. A set of permissible words for a parity-check coding corresponds to a set of words satisfying parity constraints. A parity constraint on a word is a constraint of the form $$b_{i_1} + b_{i_2} + \Lambda + b_{i_k} = 0$$

where the $b_i$ represent selected bits of the word. A word satisfies the parity constraint if the binary sum of the selected bits of the word is zero. As an example of a parity-check code, consider four bit words with two parity constraints. The first constraint specifies that the sum of the first, third, and fourth bit are zero. The second constraint specifies that the sum of the second and third bit is zero. Four four-bit words satisfy these constraints:

1110

1001

0111

0000

An LDPC code is a parity-check code in which each parity constraint may contain only a small number of parity check bits. Very efficient coding/decoding algorithms may exist for LDPC codes. LDPC codes may achieve channel capacity in certain channels. A third form of coding is turbo coding. In turbo coding, a code word is composed of three sub-blocks of bits. The first sub-block contains the actual data. The second block contains a fixed number of parity check bits for the actual data. The third block contains the same fixed number of parity check bits, for a known permutation of the actual data.

The higher power permissible in MAC transmission methods may produce better reception in low signal quality conditions for devices such as the wireless devices of FIG. 1. The higher power may, however, be wasteful in good signal quality conditions. In addition, the coding/decoding process may absorb a significant amount of computational resources.

In the example of FIG. 1, wireless network 100 may select the use of an OFDM transmission method during conditions of good signal quality and may select the use of MAC transmission methods during conditions of poor signal quality. The selection of transmission methods may provide the wireless network 100 with the advantages of both. The wireless network devices (110, 120, 130, and 140) may use a transmission method which requires lower power and easier computation at high signal quality while using full power to improve transmission in lower power situations.

The wireless network 100 illustrated in FIG. 1 is for explanation, not for limitation. Systems for wireless communications useful according to various embodiments of the present invention may include additional wireless devices or may omit some of the wireless devices shown. Wireless devices included in a wireless network may include smart phones, pagers, e-mail appliances, special-purpose units for scanning, bar coding, and credit card reading, and other devices that may be known to those of skill in the art.

Other embodiments may communicate according to a variety of wireless protocols including NFC (Near Field Communications), WLAN (Wireless Local Area Network), WMAN (Wireless Metropolitan Area Network), WiMAX (Worldwide Interoperability for Microwave Access), 3.5-3 G cellular, RAN (Radio Access Network), PAN (personal area network), 4 G, RFID (Radio Frequency Identification), and other wireless protocols which may be known to those of skill in the art. IEEE standards 802.11a, 802.11b, 802.11g, or 802.11n may apply to WLAN networks. IEEE standard 802.16 may apply to WiMAX networks. Standard ECMA-368 may apply to PAN networks.

A variety of network architectures may be used in other embodiments. In many embodiments, access point 110 may be connected to a wireline network such as the Internet and may act as a bridge between the wireline network and the wireless devices. Wireless devices such as wireless device 140 may communicate over the wireline network by communicating with access point 110. Access point 110 may then relay the communications over the wireline network. In many embodiments, access point 110 may relay communications to other access points and receive communications from other access points. This relay of communications may enable mobile stations associated with the access point to communicate with mobile stations associated with the other access points. In a number of embodiments, a network system may include multiple access points and controllers which control their operations. The multiple access points may handle the physical reception and transmission, and the controllers may handle much of the administrative processing of the network system.

For purposes of this application, the term access point shall mean any wireless device that may communicate with multiple mobile stations and may relay communications from one mobile station to another. The term "access point" shall include, but not be limited to, access points as defined in IEEE 802.11 and base stations as defined in IEEE 802.16. A mobile station associates with an access point when the mobile station selects the access point for direct wireless communications.

Figure 2:
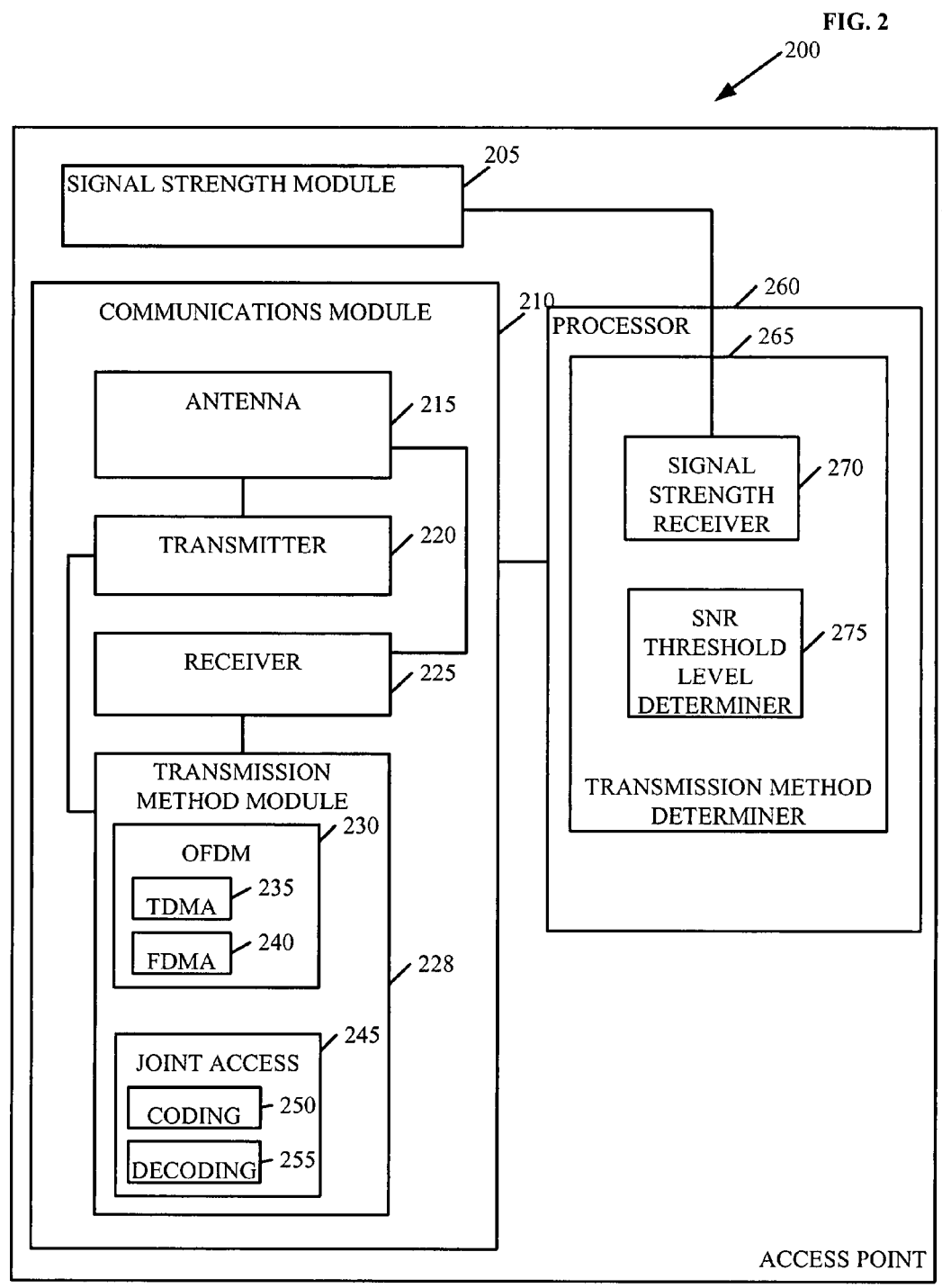
FIG. 2 is a diagram of an embodiment of an apparatus to base the method of transmission of a station on the SNRs of a plurality of wireless devices.

Turning to FIG. 2, shown is a diagram of an embodiment of an apparatus to base the method of transmission of a wireless device on the SNRs of a plurality of wireless devices. Access point 200 includes a signal strength module 205, a communications module 210, and a processor 260. In other embodiments, the functions of access point 200 may be shared between an access point and a controller, or otherwise carried out by physical mechanisms as will occur to those of skill in the art.

Signal strength module 205 may determine the signal strength of access point 200 at receiver 225. The signal strength may be measured in terms of SNR. In some embodiments, signal strength module 205 may measure the strength of the signal at receiver 225, receive a measure of the power of the signal transmitted to receiver 225, and calculate the SNR ratio from the two measures. Signal strength module 205 may consist of hardware or software. In some embodiments, signal strength module 205 may consist of an RSSI (received signal strength indicator). An RSSI is a circuit to measure the strength of an incoming signal. Signal strength module 205 may transmit the strength of the signal to signal strength receiver 270 of processor 260.

Communications module 210 includes antenna 215, transmitter 220, receiver 225, and transmission method module 228. Transmitter 220 may modulate information onto a carrier signal, amplify the signal, and broadcast the signal over the channel. Receiver 225 may take in the transmitted signal from the channel and process it to retrieve the information signal. Receiver 225 may attempt to discriminate the signal from other signals which may use the same channel, amplify the signal for processing, and demodulate or remove the carrier from the processed signal to retrieve the information that was sent.

Transmission method module 228 may transform information for transmission into the proper form for the applicable transmission method, and may transform a signal received by a transmission method into the information represented by the signal. Transmission method module 228 may operate in connection with transmitter 220 and receiver 225. Transmission method module 228 includes OFDM module 230 and joint access module 245. OFDM module 230 may divide serial data into parallel data and send the data to transmitter 220 for transmission by OFDM. OFDM module 230 may also receive parallel signals from receiver 225 and convert them into serial data. OFDM module 230 includes TDMA module 235 and FDMA module 240 for processing OFDM communications by multiple stations sharing bandwidth. TDMA module 235 may process communications in which the stations divide up use of the bandwidth by time. FDMA 240 may process OFDM communications in which the bandwidth is divided up by frequency. The submodules of OFDM 230 are for illustration and not limitation. In other embodiments of the invention, bandwidth may be divided up both by time and frequency.

Joint access module 245 may process communications in which transmitting stations may utilize the entire available bandwidth simultaneously. Such operations may produce interference from the multiple stations. To reduce the errors caused by the interference, the transmissions may be coded. Joint access module 245 includes coding module 250 for coding the information for transmission and decoding module 255 for decoding the information that is received. Coding module 250 and decoding module 255 may implement LDPC coding, turbo coding, CCK coding, turbo coding, or other methods of coding which may be known to those of skill in the art.

Processor 260 includes transmission method determiner 265. Transmission method determiner 265 may determine a transmission method for use by stations associated with access point 200. Transmission method determiner 265 may base the transmission method upon the signal strengths of the stations associated with access point 200. Transmission method determiner 265 includes signal strength receiver 270 and SNR threshold level determiner 275. Signal strength receiver 270 may receive an indication of the signal strength at receiver 225 from signal strength module 205 and may receive an indication of signal strength from other stations associated with access point 200. The signal strength may be measured as SNR.

SNR threshold level determiner 275 determines an SNR threshold level. In some embodiments, transmission method determiner 265 may select an OFDM transmission method if the SNRs of the stations associated with access point 200 are above the SNR threshold level, and may select a MAC transmission method if the SNRs of the stations are below the SNR threshold level. SNR threshold level determiner 275 may determine an SNR level at which total throughput for the stations is approximately the same whether the stations communicate by an OFDM transmission method or by a MAC transmission method.

Turning to FIGS. 4A and 4B, presented are graphs 405, 410, 415, 420, 425, and 430 illustrating the kinds of data that an SNR threshold level determiner 275 may examine in determining an SNR threshold level. The graphs (405, 410, 415, 420, 425, and 430) compare the achievable rates for a pair of stations with fixed SNR values under OFDM and MAC transmission methods. The achievable rate is measured in bits/second/hertz. Each graph depicts a two-dimensional region. In each graph, the X-axis represents the data rate one station (x-station) can achieve, while the Y-axis represents the data rate the other station (y-station) can achieve. In graphs 405, 410, and 415 of FIG. 4A, the x-station has an SNR of −1 DB and the y-station has an SNR of 1 DB. In graphs 420, 425, and 430 of FIG. 4B, the x-station has an SNR of 18 DB and the y-station has an SNR of 20 DB.

Graphs 415 in FIG. 4A and 430 in FIG. 4B, indicated by dashed lines, show the data rate achievable by the FDMA version of OFDM. In the examples of FIGS. 4A and 4B, the x-station and y-station each transmit using a separate half of the subchannels or frequencies available under OFDM transmission. By information theory, FDMA may achieve rate pair ($\frac{1}{2} \log_2(1+SNR1)$, $\frac{1}{2} \log_2(1+SNR2)$), where SNR1 is the SNR of the x-receiver and SNR2 is the SNR of the y-receiver. Accordingly, the regions bounded by graphs 415 and 430 are rectangular. The maximum rate of the x-station is slightly more than 0.4 in FIG. 4A and 3 in FIG. 4B, and the rate of the y-station is slightly less than 0.6 in FIG. 4A and slightly more than 3.25 in FIG. 4B. The points 419 on graph 415 and 440 on graph 430 indicate maximum total data rates achievable by the two stations. The maximum total data rates are approximately 1 at point 419 and slightly more than 6 at point 440 is.

Graphs 410 in FIG. 4A and 425 in FIG. 4B, indicated by solid lines, show the data rates achievable by the TDMA version of OFDM. In this version of OFDM, the devices time-share access to a channel. By information theory, TDMA may achieve a rate pair (a log$_2$(1+SNRx), (1−a) log$_2$(1+SNRy)), where a, the timesharing parameter, ranges from 0 to 1. A value of a=1 represents a 100% time share for x-station and 0% for y-station and a value of 0 represents a 0% time share for x-station and 100% for y-station. At a 100% time share, represented by the upper left points of the diagonal solid lines (410, 425), the station's achievable data rate approaches 1.2 in FIG. 4A and 7 in FIG. 4B. When the devices are allocated equal amounts of time (a=50%), the maximum throughput is indicated by the points 419 on FIG. 4A and 440 on FIG. 4B. The maximum total throughput with equal time allocation is the same as by the FDMA method. As x-station is allotted more and more time, approaching 100%, the device's throughput approaches over 0.8 in FIG. 4A and 6 in FIG. 4B. The regions representing achievable rates by TDMA are triangular, bounded by the x and y axes and the diagonal solid lines 410 and 425.

Graphs 405 in FIG. 4A and 420 in FIG. 4B, indicated by dotted lines, represent the total rates achievable by MAC. Under the MAC transmission method, both the x-station and the y-station in FIGS. 4A and 4B may transmit with up to full power. As a result, however, there may be some interference. MAC may achieve rate pairs within the pentagon determined by:

$$R1 < \log_2(1+SNR1), R2 < \log_2(1+SNR2), R1+R2 < \log_2(1+SNR1+SNR2).$$

Under the above formula, one station may achieve a maximum rate while the other station achieves a limited rate. The horizontal and vertical portions of lines 405 and 420 represent maximum rates achievable by the x-station and y-station, respectively. As the rate of the other station increases, however, the station's achievable rate decreases. The decrease is represented by the sloped portions of lines 405 and 420. In FIG. 4A, one station may achieve approximately half of maximum rate without affecting the rate of the other station. In FIG. 4B, where both devices have more power, transmission from one interferes with the other much more quickly. The vertical and horizontal portions of line 420 represent only a small portion of line 420. Points 417 on line 405 and 435 on line 420 represent points of maximum total rates. The maximum total rates at point 417 are approximately 1.7, and the maximum total throughput at point 440 is approximately 7.3.

The double-headed pointers 445 and 450 indicate the difference between total rates achievable by the methods. The points (445 and 450) extend from points of maximum total rates by FDMA (419 and 440) to points of maximum rates by MAC (417 and 435). In FIG. 4A, where the devices have relatively low SNR, MAC achieves approximately 60% higher total rate than the OFDM methods. In FIG. 4B, where the devices have relatively high SNR, MAC achieves only 16% more than the OFDM methods.

In such circumstances, SNR threshold level determiner 275 of FIG. 2 may set the SNR threshold level at or below 18 decibels. It may determine that the slight increase in total rates achieved by a MAC transmission method at these SNR levels is not worth the extra power and complexity of the MAC transmission method.

The graphs of FIGS. 4A and 4B are for illustration, not for limitation. In general, an SNR threshold level determiner may perform calculations similar to those illustrated in the graphs to compare the performance of different transmission schemes on two stations, regardless of their SNR levels, and may figure out the threshold for selecting a transmission method in practice. An SNR threshold level determiner may also consider more than two nodes. In that case, the resulting graphs would be in dimensions higher than two.

Figure 3:
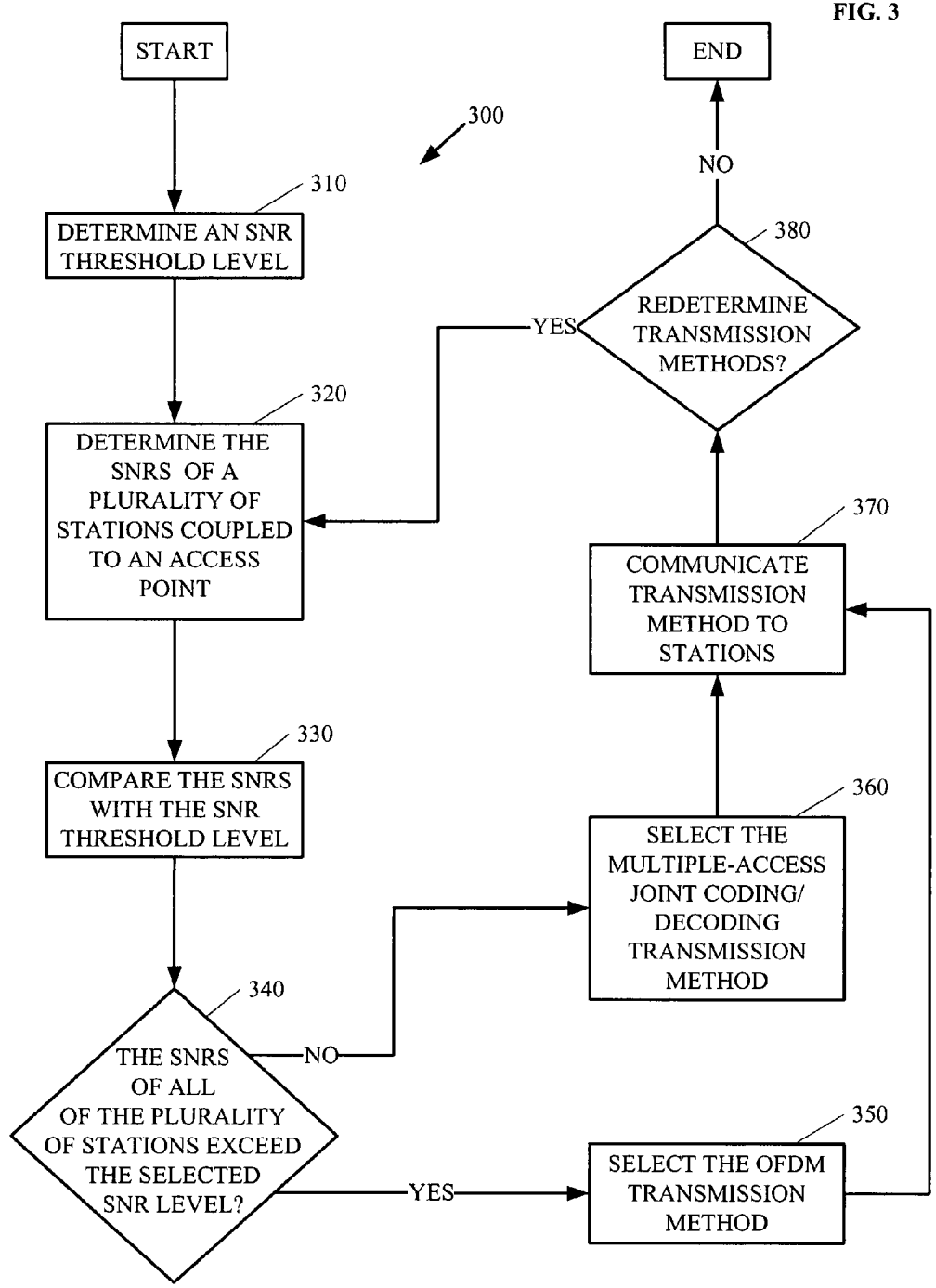
FIG. 3 is a flowchart of an embodiment of a method to base the transmission method of a station on the SNRs of a plurality of wireless devices.

FIG. 3 depicts a flowchart 300 of an embodiment to base the method of transmission of a station associated with an access point on the SNRs of a plurality of stations associated with the access point. The method of flowchart 300 may be carried out by an access point such as access point 200 depicted in FIG. 2. Flowchart 300 of FIG. 3 may include determining an SNR threshold level (element 3 10). A module such as the SNR threshold level determiner 275 of FIG. 2, for example, may examine data such as the data presented in FIGS. 4A and 4B to select an SNR level at which total throughput of stations accessing the access point by an OFDM method is approximately the same as total throughput by a MAC method.

Flowchart 300 includes determining the SNRs of multiple stations accessing an access point such as access point 200 (element 320). In some embodiments, the multiple stations may determine their SNR levels and communicate them to the access point. In other embodiments, the access point may determine the SNRs of transmissions from the stations. The access point may compare the SNRs with the SNR threshold level (element 330). If the SNRs of all of the stations exceed the SNR threshold level (element 340), then the access point may select an OFDM transmission method for communications between the stations and the access point(element 350). If the SNRs of all of the stations are below the SNR threshold level, the access point may select a MAC transmission method (element 360). A module of the access point such as transmission method determiner 265 of FIG. 2 may compare the SNRs of the stations with the SNR threshold level and determine a transmission method.

Flowchart 300 includes communicating the selected transmission method to the stations (element 370). The communications may be carried out by a communications module such as communications module 210 of FIG. 2. If access point 200 desires to redetermine transmission methods (element 380), each element of flowchart 300 from element 320 to element 370 may be repeated. A periodic redetermination of transmission methods may allow for changing circumstances. A station with low SNR connected to an access point such as access point 200 may achieve a higher SNR. It may, for example, move closer to the access point or away from interference or interference may decrease. Conversely, a station with higher SNR may suffer a lower SNR. Similarly, the composition of the stations accessing the access point may change. A station previously accessing the access point may halt communications through the access point or an additional station may access the access point. In some embodiments, the transmission method may be redetermined every time the SNRs of the connected stations are determined. Otherwise, if the transmission method is not to be redetermined, the method of flowchart 300 may end.

The elements of FIG. 3 are for illustration and not limitation. In some embodiments, the method may include selecting an OFDM transmission method for stations with SNR above an SNR threshold level, and selecting an MAC transmission method for stations with SNR below an SNR threshold level. In some further embodiments, the stations may be grouped into clusters based on SNR. The stations within a cluster with high SNR may select an OFDM method, and stations within a cluster with low SNR may select a MAC method. In other further embodiments, a group of stations which move around an access point may choose OFDM when they are close to the access point, and may choose MAC when they are far away.

In many embodiments, a transmission method may be selected without use of a fixed SNR threshold. For example, an OFDM method may be selected when relatively few stations associated with an access point have a relatively low SNR level, but a MAC method may be selected when many stations have the level. In several embodiments, the selection of a transmission method may involve calculating the SNRs of the stations and determining a total throughput under both an OFDM transmission method and a MAC transmission method. If the total throughput by the MAC method is significantly greater, it may be selected. Otherwise, the OFDM method may be selected.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

It will be apparent to those skilled in the art having the benefit of this disclosure that the present invention contemplates methods and arrangements for selection of a wireless transmission method based upon signal to noise ratios. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communications, the method comprising:
    determining by a wireless device the signal to noise ratios (SNRs) of a plurality of stations associated with an access point in a wireless network;
    selecting by the wireless device between an orthogonal frequency division multiplexing (OFDM) transmission method and a multiple-access joint coding/decoding (MAC) transmission method for communications between a station of the plurality of stations and the access point, the selecting based upon the SNRs of the plurality of stations, the selecting comprising:
        determining an SNR threshold level, comprising:
            determining a dependency of total throughput of the plurality of stations on SNR level for the OFDM transmission method and the MAC transmission method; and
            determining an SNR threshold level for which the total throughput for the OFDM transmission method at the SNR level is approximately equal to the total throughput for the MAC transmission method at the SNR level;
        selecting the MAC transmission method based upon the SNR of at least one of the plurality of stations being below the determined SNR threshold level; and
        selecting the OFDM transmission method based upon the SNR of all of the plurality of stations exceeding the selected SNR threshold level; and
    communicating by the wireless device the selected transmission method to the station of the plurality of stations.

2. The method of claim 1, further comprising redetermining by the wireless device the SNRs.

3. The method of claim 2, further comprising selecting between the OFDM transmission method and the MAC transmission method, the selecting based upon the redetermined SNRs.

4. The method of claim 1, wherein the selecting comprises selecting a low-density parity-check coding/decoding method.

5. The method of claim 1, wherein the selecting comprises selecting a transmission method in accordance with an 802.11 wireless standard.

6. The method of claim 1, wherein the selecting comprises selecting a transmission method in accordance with an 802.16 wireless standard.

7. The method of claim 1, wherein the selecting and the communicating comprise selecting by the access point and determining by the access point.

8. An apparatus for wireless communications, the apparatus comprising:
   an access point;
   a signal strength module to determine the signal to noise ratios (SNRs) of a plurality of stations associated with the access point;
   a processor, responsive to the signal strength module, to select whether the plurality of stations communicates with the access point by an orthogonal frequency division multiplexing (OFDM) transmission method or a multiple-access joint coding/decoding (MAC) transmission method, the selecting based upon the SNRs of the plurality of stations, the processor comprising:
      an SNR-level module to determine an SNR threshold level; and
      a transmission method determiner to:
         select MAC transmission methods for the plurality of stations associated with the access point based upon many stations of the plurality of stations associated with the access point having a relatively low SNR level, wherein a station of the plurality of stations has a relatively high SNR level; and
         select OFDM transmission methods for the plurality of stations associated with the access point based upon relatively few stations of the plurality of stations associated with the access point having relatively low SNR level, wherein a station of the plurality of stations has a relatively low SNR level; and
   a communications module to transmit and receive radio waves, the communications module responsive to the processor, the communications module comprising an OFDM module to transmit and receive radio waves by the OFDM transmission method and an MAC module to transmit and receive radio waves by the MAC transmission method, the communications module to communicate the selected transmission methods to the station of the plurality of stations and to communicate with the station of the plurality of stations by the selected method.

9. The apparatus of claim 8, wherein the MAC module of the communications module further comprises an low-density parity-check module to perform coding by a low-density parity-check coding method.

10. The apparatus of claim 8, wherein the communications module further comprises a standards module to transmit and receive in accordance with an 802.11 wireless standard.

11. The apparatus of claim 8, wherein the communications module further comprises a standards module to transmit and receive in accordance with an 802.16 wireless standard.

12. A method for wireless communications, the method comprising:
   determining by a wireless device the signal to noise ratios (SNRs) of a plurality of stations associated with an access point in a wireless network;
   selecting by the wireless device between an orthogonal frequency division multiplexing (OFDM) transmission method and a multiple-access joint coding/decoding (MAC) transmission method for communications between a station of the plurality of stations and the access point, the selecting based upon the SNRs of the plurality of stations;
   selecting by the wireless device between an orthogonal frequency division multiplexing (OFDM) transmission method and a multiple-access joint coding/decoding (MAC) transmission method for communications between the other stations of the plurality of stations and the access point, the selecting comprising:
      selecting MAC transmission methods for the plurality of stations associated with the access point based upon many stations of the plurality of stations associated with the access point having a relatively low SNR level, wherein selecting MAC transmission methods comprise selecting a MAC transmission method for a station of the plurality of stations, wherein the station has a relatively high SNR level; and
      selecting OFDM transmission methods for the plurality of stations associated with the access point based upon relatively few stations of the plurality of stations associated with the access point having a relatively low SNR level, wherein selecting OFDM transmission methods comprise selecting an OFDM transmission method for a station of the plurality of stations, wherein the station has a relatively low SNR level; and
   communicating by the wireless device the selected transmission methods to the plurality of stations associated with the access point.

13. The method of claim 12, further comprising redetermining by the wireless device the SNRs.

14. The method of claim 13, further comprising selecting between the OFDM transmission method and the MAC transmission method, the selecting based upon the redetermined SNRs.

15. The method of claim 12, wherein the selecting comprises selecting a low-density parity-check coding/decoding method.

16. The method of claim 12, wherein the selecting comprises selecting a transmission method in accordance with an 802.11 wireless standard.

17. The method of claim 12, wherein the selecting comprises selecting a transmission method in accordance with an 802.16 wireless standard.

18. The method of claim 12, wherein the selecting and the communicating comprise selecting by the access point and determining by the access point.

* * * * *